United States Patent [19]

Holle

[11] Patent Number: 4,629,851

[45] Date of Patent: Dec. 16, 1986

[54] APPARATUS FOR HEATING A LAYER OF DIELECTRIC MATERIAL USING RADIO FREQUENCY WAVES

[75] Inventor: Johannes Holle, Berlin, Fed. Rep. of Germany

[73] Assignee: Siemens Aktiengesellschaft, Berlin and Munich, Fed. Rep. of Germany

[21] Appl. No.: 762,459

[22] Filed: Aug. 5, 1985

[30] Foreign Application Priority Data

Sep. 20, 1984 [DE] Fed. Rep. of Germany ....... 3434605

[51] Int. Cl.$^4$ ............................................. H05B 6/48
[52] U.S. Cl. ............................. 219/10.81; 219/10.41; 219/10.77
[58] Field of Search .............. 219/10.81, 10.75, 10.77, 219/10.69, 10.41, 10.43; 34/1

[56] References Cited

U.S. PATENT DOCUMENTS

| 2,473,041 | 6/1949 | Urbain et al. | 219/10.81 X |
| 2,548,093 | 4/1951 | Blewitt | 219/10.81 X |
| 3,090,737 | 5/1963 | Swartz | 219/10.81 X |
| 3,598,951 | 8/1971 | Mann | 219/10.75 |

Primary Examiner—Philip H. Leung
Attorney, Agent, or Firm—Hill, Van Santen, Steadman & Simpson

[57] ABSTRACT

A dielectric layer is located between two capacitor electrodes and is heated by a radio frequency transmitted from a radio frequency generator. In order to conduct a high energy from the generator into the load, a coaxial line having a length which corresponds to ¼ of the wavelength of the desired frequency is utilized and its characteristic impedance is formed from the geometrical mean of real load resistance and optimum working resistance of the generator.

17 Claims, 3 Drawing Figures

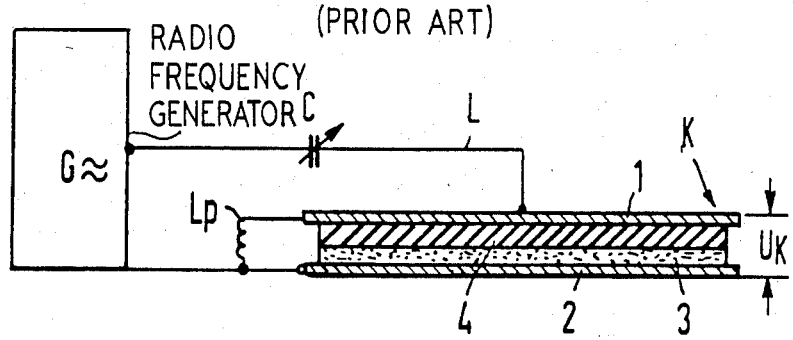
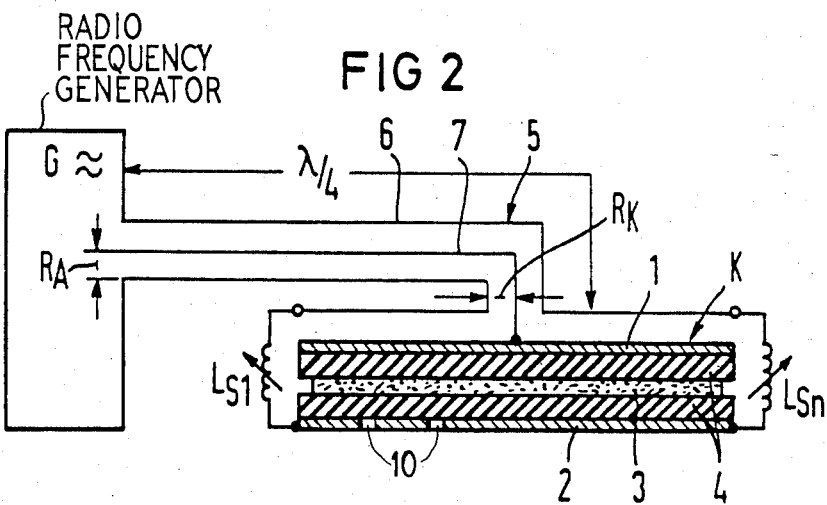
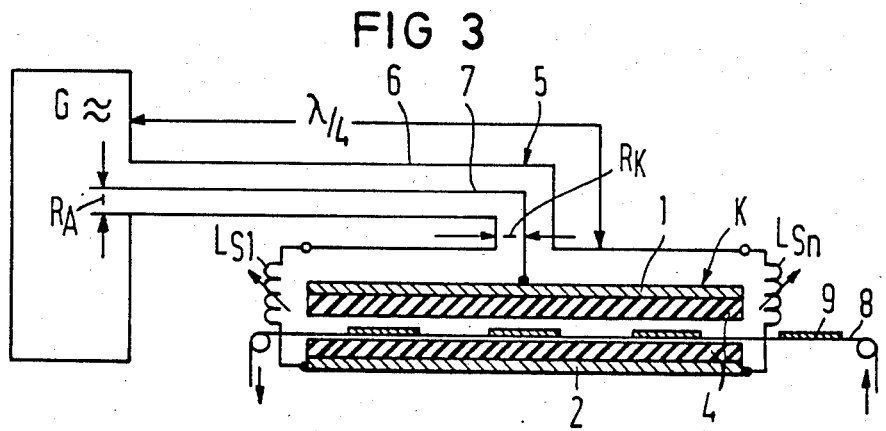

APPARATUS FOR HEATING A LAYER OF DIELECTRIC MATERIAL USING RADIO FREQUENCY WAVES

BACKGROUND OF THE INVENTION

1. Field of the Invention

The present invention relates to apparatus for heating a layer of dielectric material with waves of a radio frequency, preferable of the high frequency range, the apparatus containing a radio frequency generator, electrodes of a load and feed lines between the radio frequency generator and the load, the working frequency of the generator being balanced to a series resonance of the capacitor formed by the electrode, the feed lines and the generator and in which a parallel resonance circuit with the resonant frequency of the series resonant circuit is effective, simultaneously, for the radio frequency generator.

2. Description of the Prior Art

Apparatus of the type set forth above are known, in general, and are used for drying leather, for example. It has turned out in large area devices which have very low electrical resistance, however, that extraordinarily high currents are necessary in order to achieve the desired effect. For facilitation, therefore, one or more inductances are connected in parallel to the load, these inductances forming a high-resistant parallel resonant circuit together with the capacitive load impedance. Furthermore, the inductance of the feed is augmented by a series capacitance to form a series oscillating circuit with the frequency of the generator, so the reactive impedance of the feed is compensated for the generator frequency. The circuit formed by the load and by the inductances connected in parallel, however, change with respect to its resonant frequency during the heating-up operation when the apparatus is operated. The generator frequency which had been finally adjusted, according to the prior art, therefore, enables the full exploitation of the generator power only for a portion of the processing time in the cases under consideration, in that the feed satisfies the effective power set in the load and in the inductances. The resonant circuit, however, becomes detuned to such a degree during the heat-up operation, particularly when drying leather or similar articles, so that a considerable reactive power must be exerted in addition to the effective power.

SUMMARY OF THE INVENTION

The object of the present invention, therefore, given an apparatus of the type generally set forth above, is in an increase of the radio frequency power available at the load and in preventing a reduction of this radio frequency power during operation.

The above object is achieved, according to the present invention, in a circuit of the type set forth above which is particularly characterized in that the resonant frequency is defined by the series connection of a series inductance to the capacitance of a load and the working frequency of the generator is defined by the resonant frequency, in that a coaxial line serves as the feed to the electrodes of the load, in that the length of the coaxial line is dependent on the wavelength of the working frequency of the generator and fulfills the relationship $L = \lambda/4 + m\lambda/2$, ($m = 1, 2, 3 \ldots$ etc.) and in that the characteristic impedance of the coaxial line is selected such that a value of the working resistance which is favorable for the generator derives from the ratio of the square of the characteristic impedance to the real load resistance. According to the invention, the capacitive load impedance is augmented by a series inductance to form a series resonant circuit whose resonant frequency, in fact, changes during the execution of a job, but wherein this change is rendered harmless because the working frequency in the generator is directly defined by the attenuated load series resonant circuit, whereby the series resonant circuit is effective as a parallel resonant circuit at the generator side of the coaxial line. In comparison to the generator power exerted, the power converted into real load resistances is therefore always optimum. This is of great significance particularly when drying damp dielectrics, for example leather, because relatively short drying times between two and six minutes is standard in such operations and a considerable change of the resonant frequency occurs during this drying time. In traditional systems, the follow-up of the resonant frequency in such operations raises considerable difficulties and triggers considerable disruptions due to the required change-over operations, the disruptions reacting on the network in making considerable suppressor devices necessary. These disruptions are eliminated, according to the present invention, since the reactive impedances are not effective.

The circuits constructed in accordance with the present invention also exhibit a further, considerable advantage over the art. It has also been proven, in particular, that in the use of standard circuits, resonant oscillations having a frequency differing from the reference frequency can be excited which do not feed the load, but indeed lead to additional disruptions. These undesired resonant oscillations are avoided by the use, according to the present invention, of a coaxial line having a length $L = \lambda/4$. The present invention is particularly suited for feeding radio frequency energy into very low-resistant loads having a variable reactive impedance.

The dimensioning of the coaxial line derives from the theory of coaxial lines in conjunction with quadripole theory. The significant relationships shall be explained below with reference to the drawing.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a schematic representation of a circuit arrangement of the prior art;

FIG. 2 is a schematic representation illustrating the circuit arrangement of the present invention and FIG. 3 is a schematic representation, similar to that of FIG. 2, and further showing a conveyor belt for conveying leather members between the electrodes.

DESCRIPTION OF THE PREFERRED EMBODIMENTS

Referring to the drawing, a load K comprises capacitor electrodes 1 and 2 and dielectric layers 3 and 4. The dielectric layer 3 is to be heated by the radio frequency. The dielectric layer 4 prevents a short circuit given faults in the dielectric layer 3. The dielectric layer 4 can comprise, for example, rubber. The dielectric layer 3 can be a leather layer which is to be dryed. In this case, it is recommended to provide recesses in the electrode 2 through which the moisture can escape. Instead of the dielectric layer 3, however, two or more dielectric layers of plastic can be provided which are to be welded over their entire areas to one another by the radio frequency.

An inductance $L_p$ is connected in parallel with the capacitor electrodes 1 and 2. Together with the capacitance $C_K$ of the load K, the inductance $L_p$ forms a parallel resonant circuit, as a consequence whereof the load impedance has become high-resistant and real as long as there is still no detuning.

A variable capacitor C is also connected into the feed to the load K. Together with the line inductance L, the capacitor C forms a series resonant circuit, so that the radio frequency fed in from the generator need not overcome any reactive impedance on the feed line, as shown in FIG. 1.

Referring to FIG. 2, the feed from the radio frequency generator G to the load K is formed by a coaxial line 5 comprising an inner conductor 7 and an outer conductor 6. As a result, the capacitor C and the parallel inductance $L_p$ can be eliminated. Only a variable series inductance $L_S$ here, for example, is divided into a plurality of individual inductances $L_{S1}$-$L_{Sn}$ distributed over the circumference of the load K. It can be formed by correspondingly dimensioned current feed ribbons.

The coaxial line 5 has a length $\lambda/4$, where $\lambda$ is the wavelength of the working frequency generated by the radio frequency generator G. It therefore transforms the resistance $\vec{R}_K$ at the output by the factor $Z^2/\vec{R}_K$, where Z is the characteristic impedance and $\vec{R}_K$ is the overall load resistance according to equation 3 below.

The present invention therefore enables the involved devices required in the prior art for resistance transformation in the generator to be eliminated.

The following equation (1) can be utilized for the dimensioning of the characteristic impedance C of the coaxial line 5 from the real load resistance $R_K$ and the desired operating resistance $R_A$ of the generator:

$$Z = \sqrt{R_K \cdot R_A} \tag{1}$$

where $R_K$ and $R_A$ represent real resistances at the working frequencies.

The capacitive load impedance $\vec{X}_K$ represents a loss-affected capacitance given the load K under consideration here which fulfills the equation:

$$\vec{X}_K = -j\frac{1}{\omega C_K} + \frac{1}{\omega C_K} \cdot \frac{1}{Q} \tag{2}$$

In order to reduce the load impedance $\vec{X}_K$, a series inductance $L_S$ is connected preceding the load K. An overall load resistance $\vec{R}_K$ therefore derives according to the equation:

$$\vec{R}_K = -j\frac{1}{\omega C_K} + \frac{1}{\omega C_K} \cdot \frac{1}{Q} + j\omega L_S \tag{3}$$

For the formation of a series resistance at the working frequency, the series inductance $L_S$ is balanced to the load capacitance $C_K$ according to the equation $$-j\frac{1}{\omega C_K} + j\omega L_S = 0 \tag{4}$$

so that only the effective resistance from equation (3)

$$\frac{1}{\omega C_K} \cdot \frac{1}{Q} = R_K \tag{5}$$

is to be taken into consideration as a load resistance $R_K$ for the current flowing through the coaxial line 5. The factor Q is thereby dependent on the frequency and on the material of the dielectric material and can change during the treatment, for example due to the evaporation of moisture from the dielectric material. When the load K has chronologically different values of capacitance $C_K$, the series inductance $L_S$ is advantageously adjustable. For treatments wherein regularly similar changes of the capacitance $C_K$ of the load occur, it is advantageous that the inductance is automatically controlled in accordance with this change of capacitance that the resonant frequency remains at least approximately constant. This occurs, for example, upon evaporation of materials from the treated layer when the dielectric constant varies. A similar effect occurs given a change of the layer thickness as a consequence of the treatment when the spacing of the capacitor electrodes is thereby changed.

For drying leather, an embodiment is advantageous wherein the two capacitor electrodes 1 and 2 are protected by electrically non-conductive moisture-proof layers and the leather to be dried is introduced between these layers. It is thereby not necessary that the layers lie directly on one another; on the contrary, air can, for example, be present between the layers. As a result, for example, it is also possible to conduct the material to be treated between the capacitor electrodes on a conveyor belt with a slight speed adequate for the treatment. As shown in FIG. 3, and in particular for drying leather members 9, the leather members 9 may be fed between the electrodes by way of a conveyor belt 8. Also, and as shown in FIG. 2, at least one of the electrodes, here the electrode 2, may be provided with openings 10 for the escape of evaporating moisture.

An efficiently operating embodiment is established when the generator G can output a radio frequency (RF) voltage of at least 10 kV$_S$ and a radio frequency power of at least 40 kW and when the working resistance $R_A$ lies between about 1 k$\Omega$ and 1.5 k$\Omega$. An embodiment having, for example, a capacitor area of 5 square meters and an electrode spacing of 13 mm and having leather as the dielectric layer 3 falls into this range. The two electrodes 1 and 2 are covered with roughly 6 mm thick rubber bearings 4 between which roughly 1 mm thick leather is introduced as a dielectric layer 3. This embodiment enables a rapid and gentle drying of the leather.

A load resistance of 0.014$\Omega$ derives therefrom in the case of a series resonance. When a generator resistance $R_A$ of 1.2 k$\Omega$ is to be achieved, then a characteristic impedance Z of about 4$\Omega$ derives from the equation (1).

An advantageous dimensioning of the coaxial line derives at a working frequency of 13.5 MHz, since the line length thereby amounts to 5 meters.

As needed, a line length of $\lambda/4 + m\lambda/2$ can be used instead of the line length of $\lambda/4$ (m=1,2,3 ... etc.).

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for heating a dielectric layer, comprising:
    first and second electrodes for receiving the dielectric layer therebetween and therewith forming a load;
    a radio frequency generator producing a predetermined voltage at a predetermined frequency;
    a coaxial cable including an inner conductor for connecting said generator to said first electrode and an outer conductor for connecting said generator to said second electrode;
    at least one inductor connecting said outer conductor to said second electrode;
    a series resonant circuit including the capacitance of said electrodes, said conductors of said coaxial cable and said radio frequency generator, and a parallel resonant circuit having a resonant frequency equal to the resonant frequency of said series resonant circuit effective for the output of said radio frequency generator, said resonant frequency defined by the inductance $L_S$ connected in series with the capacitance $C_K$ of the load, the resonant frequency defining said predetermined frequency of said radio frequency generator; and
    said cable having a length L defined by the relationship $L=\lambda/4+\lambda/2$, where $\lambda$ is the wavelength and m=0 1, 2, 3 ... etc., and a characteristic impedance Z selected such that the value of the operating resistance $R_A$ of said generator is defined by the relationship $Z^2/R_K$, where $R_K$ is the resistance of the load.

2. The apparatus of claim 1, wherein:
    during heating the capacitance $C_K$ of said load changes due to the evaporation of moisture; and
    said inductor is a variable inductor to compensate for the change in capacitance.

3. The apparatus of claim 1, wherein:
    said radio frequency generator is a generator producing a radio frequency output voltage of at least 10 kV and a radio frequency power of at least 40 kV and comprises an operating resistance in the range of about 1.0 k$\Omega$–1.5 k$\Omega$.

4. The apparatus of claim 1, wherein:
    said dielectric layer contains moisture; and
    at least one of said electrodes comprises openings for the escape of evaporating moisture.

5. The apparatus of claim 1, and further comprising:
    a plurality of said dielectric layers; and
    conveyor means for supporting and moving said plurality of dielectric layers sequentially between said electrodes.

6. The apparatus of claim 1, wherein:
    said dielectric layer comprises leather.

7. Apparatus for heating a moist leather dielectric layer comprising:
    first and second electrodes for receiving the dielectric layer therebetween, and therewith forming a load, said electrodes spaced apart 13 mm and having an area of 5 square meters;
    a radio frequency generator producing a predetermined voltage of at least 10 KV and a radio frequency power of at least 40 KW at a frequency of 13.5 MHz;
    a coaxial cable including an inner conductor for connecting said generator to said first electrode and an outer conductor for connecting said generator to said second electrode;
    at least one inductor connecting said outer conductor to said second electrode;
    a series resonant circuit including the capacitance of said electrodes, said conductors of siid coaxial cable and said radio frequency generator, and a parallel resonant circuit having a resonant frequency equal to the resonant frequency of said series resonant circuit effective for the output of said radio frequency generator, said resonant frequency defined by the inductance $L_S$ connected in series with the capacitance $C_K$ of the load, the resonant frequency defining said predetermined frequency of said radio frequency generator; and
    said cable having a length L of 5 meters defined by the relationship $L=\lambda/4+m\lambda/2$, where $\lambda$ is the wavelength and m+1, 2, 3 ... etc, and a characteristic impedance Z of 4$\Omega$ selected such that the value of the operating resistance $R_A$ of said generator is 1.2 k$\Omega$ and is defined by the relationship $Z^2/R_K$, where $R_K$ is 0.014 ohm and is the resistance of the load.

8. The apparatus of claim 7, and further comprising:
    first and second rubber layers respectively carried on facing surfaces of said electrodes.

9. The apparatus of claim 8, wherein:
    said rubber layers each comprise a thickness of 6 mm.

10. The apparatus of claim 9, and further comprising:
    conveyor means extending between said rubber layers, said rubber layers constituting bearings, and said conveyor means carrying a plurality of said leather dielectric layers between said electrodes for drying.

11. The apparatus of claim 10, wherein:
    at least one of said electrodes comprises holes for the escape of evaporating moisture.

12. The apparatus of claim 11, wherein:
    said leather dielectric layer comprises a thickness of 1 mm.

13. A method for heating a dielectric layer between a pair of electrodes and therewith forming a load, comprising the steps of:
    generating a predetermined radio frequency signal with a radio frequency generator;
    applying the predetermined radio frequency signal to the electrodes by way of a series resonant circuit between the generator and the electrodes having a resonant frequency equal to and defines the predetermined radio frequency; and
    simultaneously applying the series resonant circuit to the radio frequency generator and to a parallel resonant circuit at the same resonant frequency so that the radio frequency power of the generator is optimally converted into real load power as the resonant frequency changes due to changes in the capacitance of the load.

14. The method of claim 13, wherein the dielectric layer is leather and further comprising the step of:
    conveying the leather between the electrodes for a predetermined drying interval.

15. Apparatus for heating a dielectric layer comprising:
first and second electrodes for receiving the dielectric layer therebetween, and therewith forming a load;
a radio frequency generator producing a predetermined voltage at a predetermined frequency;
a coaxial cable including an inner conductor for connecting said generator to said first electrode and an outer conductor for connecting said generator to said second electrode;
at least one inductor connecting said outer conductor to said second electrode;
a series resonant circuit including the capacitance of said electrodes, said conductors of said coaxial cable and said radio frequency generator, and a parallel resonant circuit having a resonant frequency equal to the resonant frequency of said series resonant circuit effective for the output of said radio frequency generator, said resonant frequency defined by the inductance $L_S$ connected in series with the capacitance $C_K$ of the load, the resonant frequency defining said predetermined frequency of said radio frequency generator; and
said cable having a length L defined by the relationship $L=\lambda/4$, where $\lambda$ is the wavelength, and a characteristic impedance Z selected such that the value of the operating resistance $R_A$ of said generator is defined by the relationship $Z^2/R_K$, where $R_K$ is the resistance of the load.

16. Apparatus for heating a dielectric layer comprising:
first and second electrodes for receiving the dielectric layer therebetween and therewith forming a load;
a radio frequency generator producing a predetermined voltage at a predetermined frequency;
a coaxial cable including an inner conductor for connecting said generator to said first electrode and an outer conductor for connecting said generator to said second electrode;
a pair of inductors connected to said outer conductor and to said second electrode;
a series resonant circuit including the capacitance of said electrodes, said conductors of said coaxial cable and said radio frequency generator, and a parallel resonant circuit having a resonant frequency equal to the resonant frequency of said series resonant circuit effective for the output of said radio frequency generator, said resonant frequency defined by the inductance $L_S$ connected in series with the capacitance $C_K$ of the load, the resonant frequency defining said predetermined frequency of said radio frequency generator; and
said cable having a length L defined by the relationship $L+\lambda/4+m\lambda/2$, where $\lambda$ is the wavelength and m=1, 2, 3 . . . etc, and a characteristic impedance Z selected such that the value of the operating resistance $R_A$ of said generator is defined by the relationship $Z^2/R_K$, where $R_K$ is the resistance of the load.

17. The apparatus of claim 16, wherein:
each of said inductors is a variable inductor.

* * * * *